United States Patent
Ocher et al.

(10) Patent No.: US 10,866,960 B2
(45) Date of Patent: Dec. 15, 2020

(54) DYNAMIC EXECUTION OF ETL JOBS WITHOUT METADATA REPOSITORY

(71) Applicant: SAP SE, Walldorf (DE)

(72) Inventors: Alexander Ocher, San Francisco, CA (US); Viktor Lapitski, San Francisco, CA (US)

(73) Assignee: SAP SE, Walldorf (DE)

( * ) Notice: Subject to any disclaimer, the term of this patent is extended or adjusted under 35 U.S.C. 154(b) by 234 days.

(21) Appl. No.: 15/900,082

(22) Filed: Feb. 20, 2018

(65) Prior Publication Data

US 2019/0258736 A1    Aug. 22, 2019

(51) Int. Cl.
*G06F 16/25* (2019.01)
*G06F 16/14* (2019.01)

(52) U.S. Cl.
CPC .......... *G06F 16/254* (2019.01); *G06F 16/148* (2019.01)

(58) Field of Classification Search
CPC ..... G06F 16/254; G06F 16/148; G06F 16/258
See application file for complete search history.

(56) References Cited

U.S. PATENT DOCUMENTS

2009/0177671 A1* 7/2009 Pellegrini ............. G06F 9/5038
2018/0150529 A1* 5/2018 McPherson ............. G06F 9/542

OTHER PUBLICATIONS

Vijayendra, A Web-based ETL Tool for Data Integration Process, pp. 434-438. (Year: 2013).*
Oracle, Running Initial ETL Setup Jobs, pp. 1-18 (Year: 2006).*

* cited by examiner

*Primary Examiner* — Albert M Phillips, III
(74) *Attorney, Agent, or Firm* — Sterne, Kessler, Goldstein & Fox P.L.L.C.

(57) ABSTRACT

Disclosed herein are system, method, and computer program product embodiments for a an ETL (extract-transform-load) system. An embodiment operates by receiving, at a processor, a message including a request to move data from a source database to a target database. The data is retrieved from the source database. One or more operations to perform on the data that convert the data from a source format associated with the source database to a target format associated with the target database are determined from the message. The one or more operations are executed on the data. The data is stored on the target database in the target format.

20 Claims, 3 Drawing Sheets

DYNAMIC EXECUTION OF ETL JOBS WITHOUT METADATA REPOSITORY

BACKGROUND

ETL (extract-transform-load) tools perform data extraction, data transformation, and data loading operations. However, for an ETL tool to perform an ETL operation, the ETL tool requires information about how to connect to the various databases and what operations or transformations to perform on the data. This information or metadata is often stored in a database that requires significant computing resources to both maintain and retrieve. Then, when the ETL tool is triggered to execute a job, additional resources are required to read and collect the metadata from the disk storage before executing the job.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for an ETL system.

Figure 1:
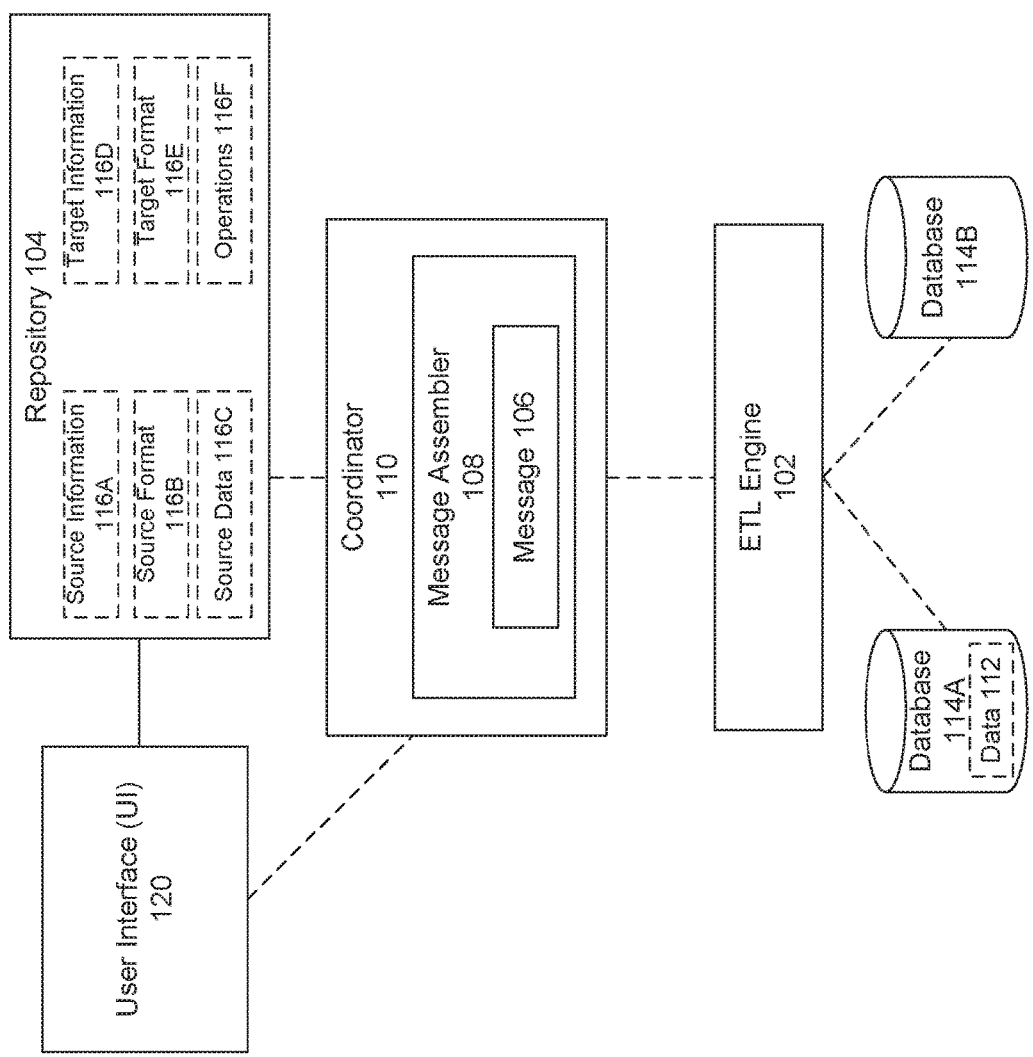
FIG. 1 is a block diagram illustrating an ETL (extract-transform-load) system, according to some embodiments.

FIG. 1 is a block diagram 100 illustrating an ETL (extract-transform-load) system, according to some embodiments. In some embodiments, the ETL engine 102 may be configured to perform data extraction, transformation, and load operations without requiring direct access to a disk or other repository 104 that would otherwise need to be read for an ETL engine to execute a job.

Repository 104 may include a database or other disk-storage system in which job information 116 or metadata about jobs may be stored. In some embodiments, the ETL engine 102 requires job information 116 to execute various data processing or data movement jobs. This job information 116 may indicate the resources from which and to which the data 112 is to be retrieved, processed, and moved.

In some embodiments, rather than requiring ETL engine 102 to maintain and read the job information 116 from a disk-storage or repository 104, which requires significant computing resources, a coordinator 110 may provide the requisite job information 116 to ETL engine 102 in the form of a message 106. Providing the job information 116 in the form of a message 106 saves the computing device executing ETL engine 102 significant computing time and resources that would otherwise be required to maintain and read from its own dedicated repository. These saved resources may then be allocated or made available to other computing tasks, or may be used to increase the ETL job throughput, thereby enhancing overall computer system performance and capabilities.

As a result, ETL engine 102 may be a lighter weight (consuming fewer resources) program that can be quickly installed and executed by any different number of computing devices, such as but not limited to a cloud based system. For example, a cellular phone that may have fewer computing resources or more limited bandwidth over which to receive information, may more quickly receive, install, and execute ETL engine 102 locally in order to move data or request another data processing job. This may be made possible in part because there is no separate database or repository 104 that needs to be set up and maintained on the remote or cellular device. Thus, the ETL engine 102 may have a smaller footprint than it would otherwise have if it had its own dedicated repository.

In an embodiment, a user may enter the job information 116 into a user interface (UI) 120. UI 120 may enable a user to specify the source, target, and data transformations that are necessary to move data 112 between database 114A and database 114B. This job metadata or information 116 may be stored in repository 104.

Repository 104 may collect, store, and maintain different types of job information or metadata 116. ETL engine 102 may use the job information 116, received in the form of message 106, to retrieve data 112 from a source database 114A, process or transform the data, and store the processed or transformed data on a target database 114B. For example, using job information 116 received in message 106, ETL engine 102 may determine the location of and how to connect to databases 114A and 114B, which data to retrieve, and how that data is to be processed or re-formatted to be stored on database 114B.

Source info 116A may include information that may be necessary to connect to database 114A. Example source information may include an IP (internet protocol) address, server name, socket, port, table name, username, and password information. Source format 116B may indicate the format or layout of the data 112 as it is arranged in database 114A. Source format 116B information may include data types (e.g., text, integer, real, Boolean, etc.), column labels, row labels, and primary key information. Target info 116D and target format 116E may indicate or include similar information relative to database 114B.

Source data 116C may include information necessary to identify which data 112 from database 114A is to be retrieved or extracted. In an embodiment, source data 116C may include queries that are executed against the data of database 114A used to identify a subset of the data 112 to be cut, copied, or moved to database 114B. In another embodiment, source data 116C may include identifiers that correspond to various records of database 114A. In an embodiment, target info 116D may indicate a destination as to where in database 114B the data 112 is to be moved.

Operations 116F may indicate how source format 116B maps to target format 116E. For example, operations 116F may indicate that Col A of Table 1 of database 114A maps to Col 12 of Table 3 or database 114B. Then, for example, ETL engine 102 may know to move the data of Col A to Col 12. In another embodiment, data may be moved from a column to a row, or a row to a column.

In an embodiment, operations 116F may include or indicate different data operations or transformations to be performed on data 112 before the data is stored in database 114B. In an embodiment, operations 116F may include conversion operations necessary to convert data 112 from source format 116B into target format 116E. For example a Real number data from source format 116B may need to be converted into Integer format in 116E. In another embodiment, operations may include other processing operations not necessary for format conversions between databases 114A, 114B. Example operations 116F may include filter, sort, addition, subtraction, intersection, or other data operations. Other operations 116F may include adding, deleting, or modifying the data 112.

Coordinator 110 may be a computing device or system that orchestrates or coordinates data transactions, including but not limited to ETL transactions. Though repository 104 is shown to only include job information 116, in other embodiments, repository 104 may be used by coordinator 110 to store information that is to be used by other processing systems, including but not limited to ETL engine 102. This shared repository 104 may be set up and coordinator 110 may retrieve the particular information necessary for each data processing system and message assembler 108 may compile the corresponding message. Sharing repository 104 among different processing systems allows system 100 to use fewer resources than if each system had its own repository.

In an embodiment, when an ETL job or transaction is requested by a user or otherwise determined to be performed, message assembler 108 may retrieve the necessary job information 116 from repository 104, and assemble the necessary metadata 116 into a message 106. In different embodiments, message 106 may include an extensible markup language (XML) message, an Acta Transformation Language (ATL), Java, Python, or other computing message. Message 106 may then be transmitted or otherwise provided or made available to ETL engine 102. ETL engine 102 may then compile message 106 and execute the job.

ETL engine 102, through being configured to receive, parse, compile, and process message 106, may save computing resources that would otherwise be required to maintain and access job information 116 in a separate repository 104. This may make ETL engine 102 a lightweight application that is suitable for cloud computing (for example), or that may be quickly deployed on various devices without needing to set up, maintain, and access different, independent repositories for each installation or job execution.

In an embodiment, ETL engine 102 may be installed and listen for any messages 106 which are received from coordinator 110 (e.g., rather than the start-and-stop processing of other ETL batch engines). Though only one source database 114A and one target database 114B are shown in the example of FIG. 1, in other embodiments, message 106 may instruct ETL engine 102 to retrieve information from any number of data sources with various data formats, and store, transmit, or distribute the processed data across different target databases.

Figure 2:
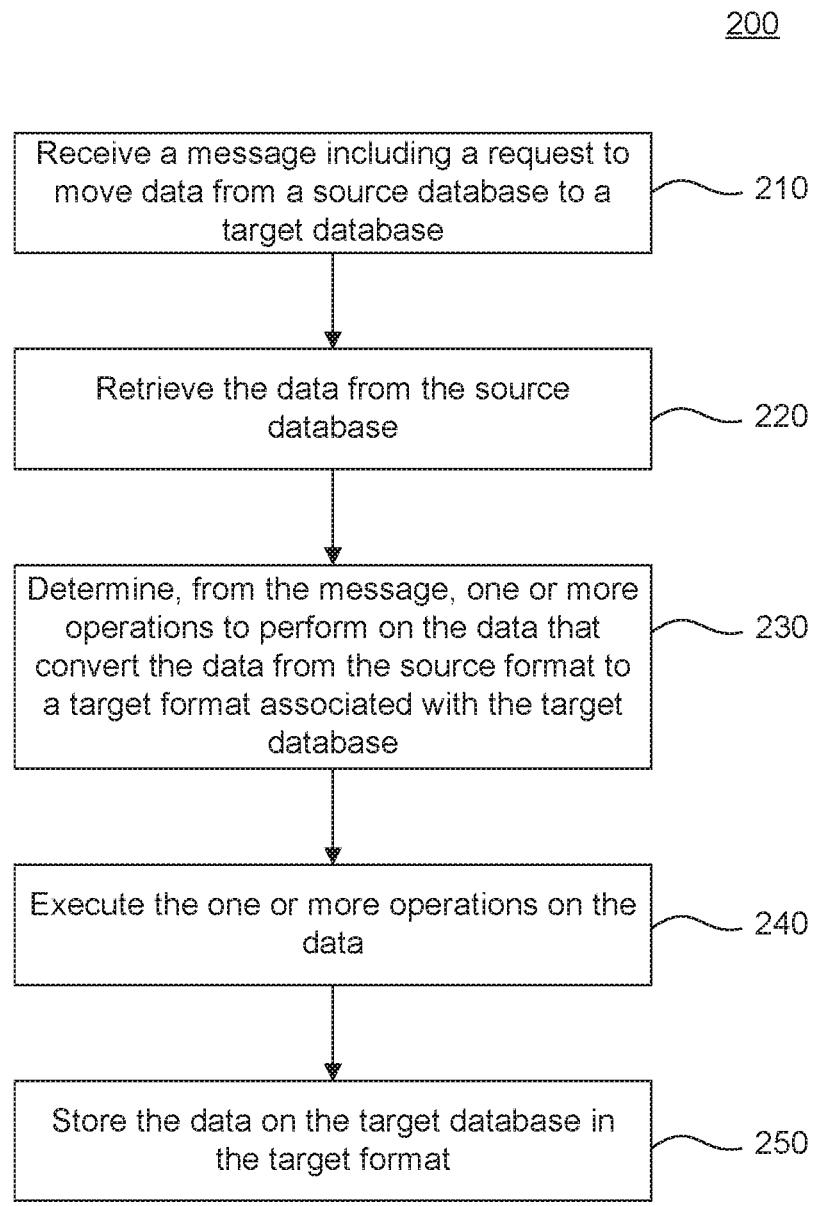
FIG. 2 a flowchart illustrating example operations of an ETL system, according to some embodiments.

FIG. 2 a flowchart 200 illustrating example operations of an ETL (extract-transform-load) system, according to some embodiments. Method 200 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 2, as will be understood by a person of ordinary skill in the art. Method 200 shall be described with reference to FIG. 1. However, method 200 is not limited to the example embodiments.

In 210, a message including a request to move data from a source database to a target database is received. For example, ETL engine 102 may receive message 106 from coordinator 110. Message 106 may include job information 116 retrieved and formatted accordingly so that ETL engine 102 can determine the details of the jobs to be executed. In an embodiment, rather than requiring the reading of data from a disk storage, coordinator 110 may pass message 106 directly to a memory where ETL engine 102 may read it. For example, through socket connections, ETL engine 102 may receive message 106 (and transmit a result back to coordinator 110 or a user device).

In 220, the data is retrieved from the source database. For example, ETL engine 102 may identify or retrieve data 112 from database 114A. Data 112 may be stored in source format 116B.

In 230, one or more operations to perform on the data that convert the data from the source format to a target format associated with the target database are determined from the message. For example, without reading from disk or repository 104, ETL engine 102 may determine which operations 116F to perform on the data 112. Example operations may add, modify, delete, or sort data.

In 240, the one or more operations are executed on the data. For example, ETL engine 102 may perform various operations 116F on the data 112. The operations 116F may convert data 112 from source format 116B into target format 116E.

In 250, the data is stored in the target format on the target database. For example, ETL engine 102 may store the processed data on database 114B. Then, for example, instead of returning data 112 to a user, the ETL engine 102 may return a status message (i.e., success or complete) to coordinator 110 or a user device indicating that the job has completed.

Figure 3:
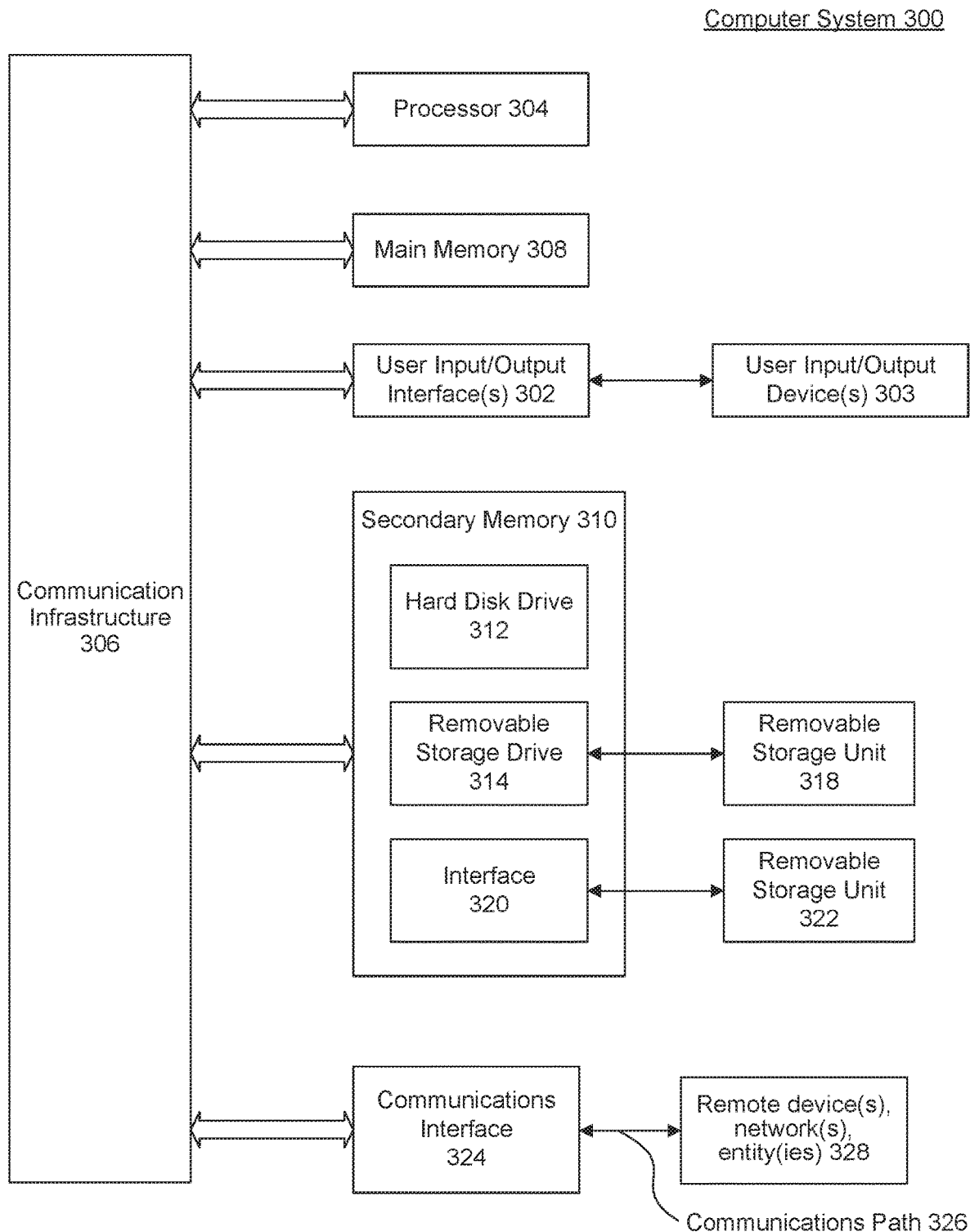
FIG. 3 is an example computer system useful for implementing various embodiments.

Various embodiments may be implemented, for example, using one or more well-known computer systems, such as computer system 300 shown in FIG. 3. One or more computer systems 300 may be used, for example, to implement any of the embodiments discussed herein, as well as combinations and sub-combinations thereof.

Computer system 300 may include one or more processors (also called central processing units, or CPUs), such as a processor 304. Processor 304 may be connected to a communication infrastructure or bus 306.

Computer system 300 may also include user input/output device(s) 303, such as monitors, keyboards, pointing devices, etc., which may communicate with communication infrastructure 306 through user input/output interface(s) 302.

One or more of processors 304 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 300 may also include a main or primary memory 308, such as random access memory (RAM). Main memory 308 may include one or more levels of cache. Main memory 308 may have stored therein control logic (i.e., computer software) and/or data.

Computer system 300 may also include one or more secondary storage devices or memory 310. Secondary memory 310 may include, for example, a hard disk drive 312 and/or a removable storage device or drive 314. Removable storage drive 314 may be a floppy disk drive, a magnetic tape drive, a compact disk drive, an optical storage device, tape backup device, and/or any other storage device/drive.

Removable storage drive 314 may interact with a removable storage unit 318. Removable storage unit 318 may include a computer usable or readable storage device having stored thereon computer software (control logic) and/or data. Removable storage unit 318 may be a floppy disk, magnetic tape, compact disk, DVD, optical storage disk, and/any other computer data storage device. Removable storage drive 314 may read from and/or write to removable storage unit 318.

Secondary memory 310 may include other means, devices, components, instrumentalities or other approaches for allowing computer programs and/or other instructions and/or data to be accessed by computer system 300. Such means, devices, components, instrumentalities or other approaches may include, for example, a removable storage unit 322 and an interface 320. Examples of the removable storage unit 322 and the interface 320 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 300 may further include a communication or network interface 324. Communication interface 324 may enable computer system 300 to communicate and interact with any combination of external devices, external networks, external entities, etc. (individually and collectively referenced by reference number 328). For example, communication interface 324 may allow computer system 300 to communicate with external or remote devices 328 over communications path 326, which may be wired and/or wireless (or a combination thereof), and which may include any combination of LANs, WANs, the Internet, etc. Control logic and/or data may be transmitted to and from computer system 300 via communication path 326.

Computer system 300 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 300 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 300 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 300, main memory 308, secondary memory 310, and removable storage units 318 and 322, as well as tangible articles of manufacture embodying any combination of the foregoing. Such control logic, when executed by one or more data processing devices (such as computer system 300), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 3. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method, comprising:
determining that an ETL (extract-transform-load) processor is configured to perform extract, transform, and load operations on data across two or more databases, including both a source database and a target database;
assembling, at a coordinator processor, a message including a request to move data from the source database to the target database, wherein the coordinator processor assembles the message based on information retrieved from a repository to which the ETL processor does not have access, and wherein the request comprises a query to be executed against the source database to identify a subset of data to be moved to the target database;
receiving, by the ETL processor, the message from the coordinator processor;
executing, by the ETL processor, the query against the source database to identify the subset of data;
retrieving, by the ETL processor, the subset of data from the source database as indicated by the message, wherein the subset of data is stored in a source format corresponding to the source database;
determining, from the message, one or more operations to perform on the subset of data that convert the subset of data from the source format to a target format associated with the target database;
executing the one or more operations on the subset of data; and
storing, by the ETL processor, the subset of data, in the target format, on the target database.

2. The method of claim 1, wherein the message includes information about how to connect to the source database and how to connect with the target database.

3. The method of claim 1, wherein the message is retrieved from a memory location without accessing a disk.

4. The method of claim 3, wherein the message is received from another processor.

5. The method of claim 1, wherein the message comprises an extensible markup language (XML) message.

6. The method of claim 1, wherein the executing comprises:
compiling the message by the processor.

7. The method of claim 1, wherein the storing comprises:
returning a job complete message indicating that the data has been stored on the target database.

8. The method of claim 1, further comprising:
assembling, by the coordinator processor, a data transaction message from information retrieved from the repository; and
transmitting, by the coordinator processor, the data transaction message to another data processor.

9. A system, comprising:
a memory; and
at least one processor coupled to the memory and configured to:
determine that an ETL (extract-transform-load) processor is configured to perform extract, transform, and load operations on data across two or more databases, including both a source database and a target database;
assembling, at a coordinator processor, a message including a request to move data from the source database to the target database, wherein the coordinator processor assembles the message based on information retrieved from a repository to which the ETL processor does not have access, and wherein the request comprises a query to be executed against the source database to identify a subset of data to be moved to the target database;
receive, by the ETL processor, the message from the coordinator processor;
execute, by the ETL processor, the query against the source database to identify the subset of data;
retrieve, by the ETL processor, the subset of data from the source database as indicated by the message, wherein the subset of data is stored in a source format corresponding to the source database;
determine, from the message, one or more operations to perform on the subset of data that convert the subset of data from the source format to a target format associated with the target database;
execute the one or more operations on the subset of data; and
store, by the ETL processor, the subset of data, in the target format, on the target database.

10. The system of claim 9, wherein the message includes information about how to connect to the source database and how to connect with the target database.

11. The system of claim 9, wherein the message is retrieved from a memory location without accessing a disk.

12. The system of claim 11, wherein the message is received from another processor.

13. The system of claim 9, wherein the message comprises an extensible markup language (XML) message.

14. The system of claim 9, wherein to execute the at least one processor is configured to:
compile the message.

15. The system of claim 9, wherein to store the data the at least one processor is configured to:
return a job complete message indicating that the data has been stored on the target database.

16. A non-transitory computer-readable device having instructions stored thereon that, when executed by at least one computing device, cause the at least one computing device to perform operations comprising:
determining that an ETL (extract-transform-load) processor is configured to perform extract, transform, and load operations on data across two or more databases, including both a source database and a target database;
assembling, at a coordinator processor, a message including a request to move data from the source database to the target database, wherein the coordinator processor assembles the message based on information retrieved from a repository to which the ETL processor does not have access, and wherein the request comprises a query to be executed against the source database to identify a subset of data to be moved to the target database;
receiving, by the ETL processor, the message from the coordinator processor;
executing, by the ETL processor, the query against the source database to identify the subset of data;
retrieving, by the ETL processor, the subset of data from the source database as indicated by the message, wherein the subset of data is stored in a source format corresponding to the source database;
determining, from the message, one or more operations to perform on the subset of data that convert the subset of data from the source format to a target format associated with the target database;

executing the one or more operations on the subset of data; and storing, by the ETL processor, the subset of data, in the target format, on the target database.

17. The non-transitory computer-readable device of claim 16, wherein the message includes information about how to connect to the source database and how to connect with the target database.

18. The non-transitory computer-readable device of claim 16, wherein the message is retrieved from a memory location without accessing a disk.

19. The non-transitory computer-readable device of claim 18, wherein the message is received from another processor.

20. The non-transitory computer-readable device of claim 16, wherein the message comprises an extensible markup language (XML) message.

* * * * *